United States Patent Office 2,937,170
Patented May 17, 1960

2,937,170

ALKYLAMINOPYRIDOGUANAMINES

Seymour L. Shapiro, Hastings-on-Hudson, and Louis Freedman, Bronxville, N.Y., assignors to U.S. Vitamin Corporation, New York, N.Y., a corporation of Delaware No Drawing. Application December 3, 1958
Serial No. 777,854

4 Claims. (Cl. 260—249.9)

This invention is concerned with ring pyridylated guanamines, and specifically with pyridylguanamines having alkylamino groups which may be represented by the following formula

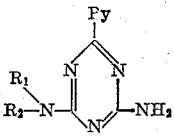

I wherein $R_1$ is alkyl having a carbon content $C_1$–$C_6$, and may be substituted or unsubstituted, and saturated and unsaturated, cycloalkyl having a carbon content of $C_5$–$C_6$, and arylalkyl having a carbon content $C_7$–$C_8$, $R_2$ is hydrogen or methyl, and those structures where $R_1$ plus $R_2$ are joined directly or through an oxygen atom to give polymethylene or oxaalkylene radicals having a carbon content $C_4$–$C_6$, and Py is selected from the group consisting of 3-pyridyl and 4-pyridyl.

The compounds of this invention show broad spectrum pharmacological effects including utility as hypotensive agents, central nervous system depressants, analgesics and anti-inflammatory agents.

The compounds of this invention are conveniently prepared by reaction in an alcoholic solution of the appropriately substituted biguanide with the ester of the pyridine carboxylic acid, as for example, ethyl nicotinate, or methyl isonicotinate according to the following equation

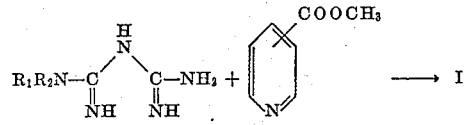

Sodium methoxide is desirably added as a catalyst. After a suitable reaction period, generally 24–96 hours at 20° C., the reaction is quenched by dilution with water and the product recovered by filtration.

The ring pyridylated guanamines herein described are weak bases, and can form salts with the mineral acids such as hydrochloric, hydrobromic, sulfuric acids and the like.

The biguanides which are required as intermediate reactants may be obtained by fusion of the amine hydrochloride $R_1R_2NH\cdot HCl$ with dicyandiamide following published procedures (Shapiro et al., J. Am. Pharm. Assoc., Sci. Ed., 46, 679 (1957); Shapiro et al., J. Am. Chem. Soc., 79, 5064 (1957)).

Typical compounds prepared in this invention are described in Table I.

TABLE I
*Pyridyl guanamines*

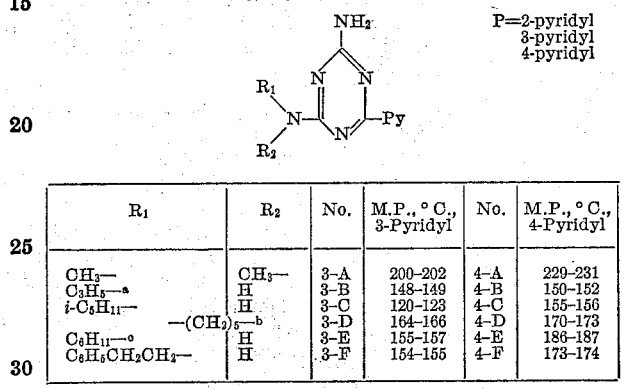

P = 2-pyridyl
3-pyridyl
4-pyridyl

| $R_1$ | $R_2$ | No. | M.P., °C., 3-Pyridyl | No. | M.P., °C., 4-Pyridyl |
|---|---|---|---|---|---|
| $CH_3$— | $CH_3$— | 3-A | 200–202 | 4-A | 229–231 |
| $C_3H_5$—[a] | H | 3-B | 148–149 | 4-B | 150–152 |
| $i$-$C_5H_{11}$— | H | 3-C | 120–123 | 4-C | 155–156 |
| —$(CH_2)_5$—[b] | | 3-D | 164–166 | 4-D | 170–173 |
| $C_6H_{11}$—[c] | H | 3-E | 155–157 | 4-E | 186–187 |
| $C_6H_5CH_2CH_2$— | H | 3-F | 154–155 | 4-F | 173–174 |

[a] $C_3H_5$ = allyl.
[b] —$(CH_2)_5$—with attached nitrogen gives a piperidyl group.
[c] $C_6H_{11}$ = cyclohexyl.

When evaluated by accepted pharmacological procedures, the following useful properties of the compounds of this invention have been noted and have been summarized in Table II.

TABLE II
*Pharmacological properties of compounds*

| No.[a] | $LD_{min}$[b] | Pharmacological Response | Quantitation of Response | Reference to Procedure Used |
|---|---|---|---|---|
| 4-B | 300 | Hypotension | 3+ | Shapiro et al., J. Am. Chem. Soc., 80, 2743 (1958). |
| 4-C | 250 | do | 2+ | Do. |
| 3-B | 300 | do | 2+ | Do. |
| 4-C | 250 | Central nervous system depression. | 33% 20 mg./kg | Shapiro et al., J. Am. Chem. Soc., 80, 1648 (1958). |
| 4-D | 250 | do | 16% 20 mg./kg | Do. |
| 3-C | 750 | do | 49% 20 mg./kg | Do. |
| 3-E | 400 | Anti-inflammatory | 15 units/gram | Shapiro et al., J. Am. Pharm. Assoc., Sci. Ed., 46, 333 (1957). |
| 4-E | 100 | Analgesic | 33% 75 mg./kg | Bianchi et al., Brit. J. Pharmacol., 9, 280 (1954). |
| 4-F | 1,000 | do | 83% 330 mg./kg | Do. |
| 3-B | 300 | Antihistamine | Inhibits histamine | Shapiro et al., J. Am. Pharm. Assoc., Sci. Ed., 46, 333 (1957). |

[a] The number used corresponds to that indicated in Table I.
[b] The $LD_{min}$ is the minimum lethal dose, in mg./kg. as established in subcutaneous tests in mice.

It will be noted that a variety of useful pharmacological responses are obtained with the compounds as described and claimed.

The invention will be more fully described in connection with the following specific examples which, however, are not to be construed as limiting.

EXAMPLE 1

*2-allylamino-4-amino-6-(3-pyridyl)-s-triazine.* — A solution of 8.9 g. (0.05 mole) of allylbiguanide hydrochloride in 50 ml. of methanol was treated with 22 ml. (0.1 mole) of 25% sodium methoxide in methanol cooled to 0° C. and a 7.6 g. (0.05 mole) portion of ethyl nicotinate added. After 72 hours at 20° C. the reaction mixture was diluted with 150 ml. of water and after 72 hours the product (6.2 g.) was separated and recrystallized (acetonitrile), melting at 148–149° C.

*Analysis.*—Calcd. for $C_{11}H_{12}N_6$: C, 57.9; H, 5.3; N, 36.8. Found: C, 58.3; H, 4.8; N, 37.2.

The product was identified further by the preparation of its picrate which melted at 220° C. (propanol).

*Analysis.*—Calcd. for $C_{17}H_{15}N_9O_7$: C, 44.6; H, 3.3; N, 27.6. Found: C, 44.6; H, 3.0; N, 27.6.

EXAMPLE 2

*2-amino-4-dimethylamino-6-(3-pyridyl) - s - triazine.*—Following the procedure of Example 1, and employing N',N'-dimethylbiguanide hydrochloride, the product (5.8 g.) was obtained from a 0.05 mole run, and upon recrystallization (ethanol) melted at 200–202° C.

*Analysis.*—Calcd. for $C_{10}H_{12}N_6$: C, 55.5; H, 5.6; N, 38.9. Found: C, 55.5; H, 6.1; N, 38.8.

In a similar manner, using N'-methyl-N'-benzylbiguanide hydrochloride, the product 2-amino-4-(N-methylbenzylamino)-6-(3-pyridyl)-s-triazine may be obtained.

EXAMPLE 3

*2-amino-4-isoamylamino-6-(3-pyridyl) - s - triazine.*—Following the procedure of Example 1, and employing isoamylbiguanide nitrate, the product (5.6 g.) was obtained from a 0.034 mole run, and upon recrystallization (acetonitrile), melted at 120–123° C.

*Analysis.*—Calcd. for $C_{13}H_{18}N_6$: C, 60.4; H, 7.0; N, 32.5. Found: C, 60.3; H, 7.0; N, 32.6.

In a similar manner, using n-butylbiguanide nitrate, the product 2-amino-4-(n-butylamino)-6-(3-pyridyl)-s-triazine may be obtained.

EXAMPLE 4

*2-amino-4-(1-piperidino)-6-(3 - pyridyl) - s - triazine.*—Following the procedure of Example 1, and employing N',N'-pentamethylenebiguanide hydrochloride, the product (4.4 g.) was obtained from a 0.026 mole run and upon recrystallization (acetonitrile), melted at 164–166° C.

*Analysis.*—Calcd. for $C_{13}H_{16}N_6$: C, 60.9; H, 6.3; N, 32.8. Found: C, 60.8; H, 6.4; N, 32.8.

In a similar manner using the biguanide derived from morpholine, the product 2-amino-4-(4-morpholino)-6-(3-pyridyl)-s-triazine may be obtained.

EXAMPLE 5

*2-amino-4-cyclohexylamino-6-(3-pyridyl) - s-triazine.*—Following the procedure of Example 1, and employing cyclohexyl biguanide, the product (8.5 g.) was obtained from a 0.05 mole run and upon recrystallization (acetonitrile, melted at 155–157° C.

*Analysis.*—Calcd. for $C_{12}H_{18}N_6$: C, 62.2; H, 6.7; N, 31.1. Found: C, 62.2; H, 6.8; N, 30.8.

EXAMPLE 6

*2-amino-4-(β-phenethylamino)-6-(4 - pyridyl) - s - triazine.*—A solution of 9.7 g. (0.04 mole) of β-phenethylbiguanide hydrochloride in 45 ml. of methanol was treated with 20 ml. (0.08 mole) of 25% sodium methoxide in methanol, cooled to 0° C. and 5.5 g. (0.04 mole) of methyl isonicotinate added. After storage at 20° C. for 5 days, the reaction was diluted with 150 ml. of water and after standing 24 hours, the product (7.2 g.) which separated was recrystallized (ethanol), melting at 173–174° C.

*Analysis.*—Calcd. for $C_{16}H_{16}N_6$: C, 65.7; H, 5.5; N, 28.8. Found: C, 65.5; H, 5.8; N, 29.0.

In a similar manner using benzylbiguanide hydrochloride, the product 2-amino-4-benzylamino-6-(4-pyridyl)-s-triazine may be obtained.

EXAMPLE 7

*2-allylamino-4-amino-6-(4-pyridyl)-s-triazine.*—Following the procedure of Example 6, and employing allylbiguanide hydrochloride, the product (6.8 g.) was obtained from a 0.05 mole run, and upon recrystallization (acetonitrile) melted at 150–152° C.

*Analysis.*—Calcd. for $C_{11}H_{12}N_6$: C, 57.9; H, 5.3; N, 36.8. Found: C, 58.0; H, 4.9; N, 37.3.

EXAMPLE 8

*2-amino-4-isoamylamino-6-(4 - pyridyl) - s - triazone.*—Following the procedure of Example 6, and employing isoamylbiguanide nitrate, the product (5.5 g.) was obtained in a 0.034 mole run and upon recrystallization (acetonitrile), melted at 155–156° C.

*Analysis.*—Calcd. for $C_{13}H_{18}N_6$: C, 60.4; H, 7.0; N, 32.5. Found: C, 60.1; H, 6.8; N, 33.2.

In a similar manner using n-amylbiguanide hydrochloride, 2-amino-4-(n-amylamino)-6-(4-pyridyl)-s-triazine may be obtained.

The novel compounds of this invention can be combined with solid or liquid pharmaceutical carriers for formulated into the form of tablets, powder packets or capsules, or, dissolved in suitable solvents for oral and parenteral administration for human or veterinary use.

It is to be understood that it is intended to cover all changes and modifications of the examples of the invention herein chosen for the purpose of illustration which do not constitute departure from the spirit and scope of the invention.

We claim:

1. 2-amino-4-isoamylamino-6-(3-pyridyl)-s-triazine.
2. 2-amino-4-cyclohexylamino-6-(3-pyridyl)-s-triazine.
3. 2-amino-4-(β-phenethylamino)-6-(4-pyridyl)-s - triazine.
4. 2-amino-4-isoamylamino-6-(4-pyridyl)-s-triazine.

References Cited in the file of this patent

UNITED STATES PATENTS 2,535,968    Thurston et al. _____ Dec. 26, 1950

OTHER REFERENCES

Detweiler et al.: Journal of the American Chemical Society, vol. 74, pages 1483 to 1485 (1952).